United States Patent
Dhanabalan et al.

(10) Patent No.: US 9,668,029 B2
(45) Date of Patent: May 30, 2017

(54) IDENTIFYING AND SELECTING AVAILABLE AUDIO PROGRAMS FOR LIVE BROADCASTED CONTENT

(71) Applicant: Verizon Patent and Licensing Inc., Arlington, VA (US)

(72) Inventors: Sankar Dhanabalan, Irving, TX (US); Kishore Tallapaneni, Flower Mound, TX (US); Enrique Ruiz-Velasco, Flower Mound, TX (US); Jaykishan Tiwari, Irving, TX (US); Anil Kumar Padi, Flower Mound, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 103 days.

(21) Appl. No.: 14/263,688

(22) Filed: Apr. 28, 2014

(65) Prior Publication Data
US 2015/0312646 A1   Oct. 29, 2015

(51) Int. Cl.
*H04H 60/32* (2008.01)
*H04N 21/81* (2011.01)
*H04N 21/262* (2011.01)
*H04N 21/2343* (2011.01)
*H04N 21/258* (2011.01)
*H04N 21/482* (2011.01)

(52) U.S. Cl.
CPC ... *H04N 21/8106* (2013.01); *H04N 21/23439* (2013.01); *H04N 21/25891* (2013.01); *H04N 21/26258* (2013.01); *H04N 21/4825* (2013.01)

(58) Field of Classification Search
CPC ............ H04N 21/4394; H04N 21/439; H04N 21/8106
USPC ............................... 725/18, 34, 35
See application file for complete search history.

(56) References Cited

U.S. PATENT DOCUMENTS

| | | | |
|---|---|---|---|
| 6,661,466 B1* | 12/2003 | Kou ........................ | H04N 5/60 348/465 |
| 8,640,181 B1* | 1/2014 | Inzerillo .......... | H04N 21/47202 348/500 |
| 2007/0211168 A1* | 9/2007 | Ko ..................... | H04N 5/44513 348/462 |
| 2007/0297454 A1* | 12/2007 | Brothers ............ | H04N 21/2368 370/486 |
| 2011/0138433 A1* | 6/2011 | Whiteing ............... | H04N 5/602 725/114 |
| 2013/0155318 A1* | 6/2013 | Boden .............. | H04N 19/00945 348/425.4 |
| 2014/0118616 A1* | 5/2014 | Oughriss ................ | H04N 7/025 348/462 |

(Continued)

*Primary Examiner* — Pankaj Kumar
*Assistant Examiner* — Sahar Baig

(57) ABSTRACT

A user device may receive information identifying one or more first audio programs available for programming content; select a first particular audio program, of the one or more first audio programs; play the first particular audio program; and receive updated information identifying one or more second audio programs available for the programming content when available audio programs change. The one or more second audio programs may be different from the one or more first audio programs. The user device may select, without user interaction, a second particular audio program, of the one or more second audio programs; and play the second particular audio program.

20 Claims, 8 Drawing Sheets

(56) References Cited

U.S. PATENT DOCUMENTS

2014/0215535 A1\* 7/2014 Elliott ................ H04N 21/2387
    725/81
2014/0237082 A1\* 8/2014 Chen ....................... H04W 4/18
    709/219

\* cited by examiner

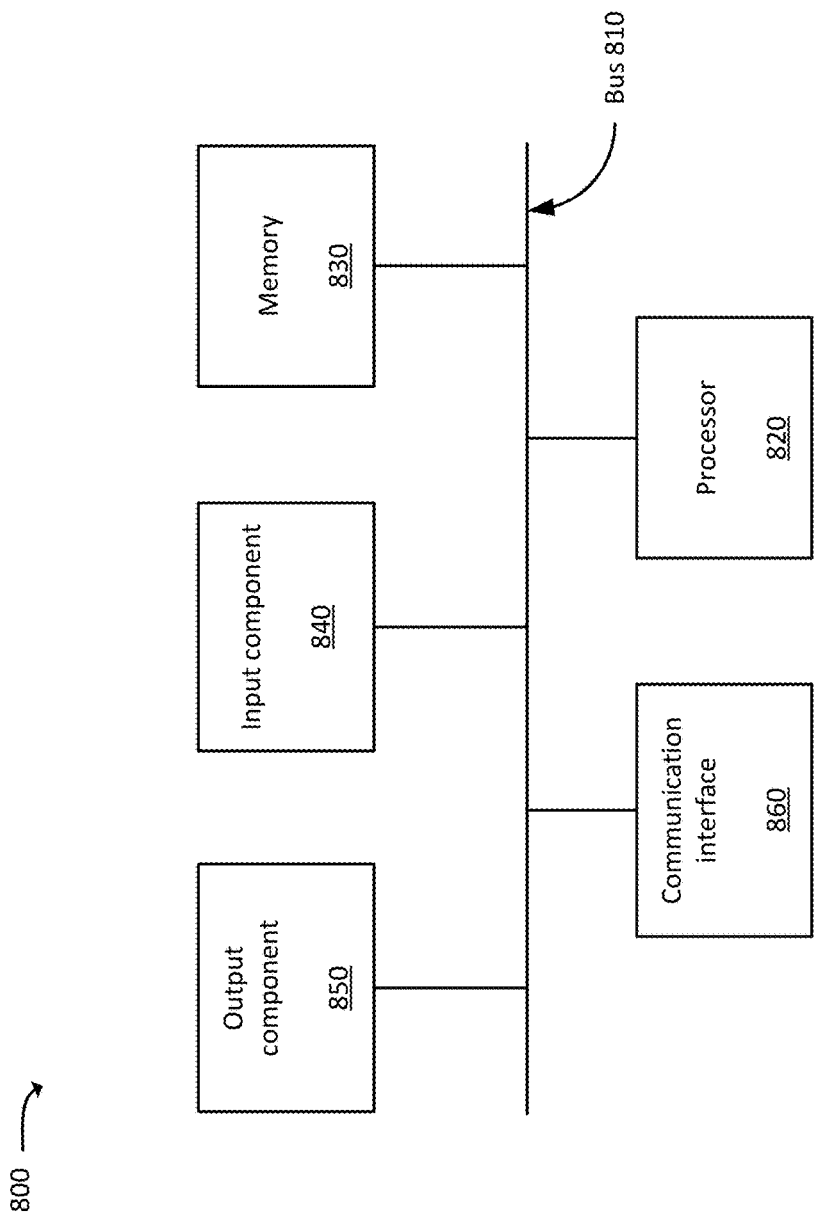

IDENTIFYING AND SELECTING AVAILABLE AUDIO PROGRAMS FOR LIVE BROADCASTED CONTENT

BACKGROUND

Multiple audio programs (e.g., a primary audio program a secondary audio program (SAP)) may be available for certain programming content. For example, an SAP may include audio of a different language than audio associated with a primary audio program. Additionally, or alternatively, an SAP may include commentary or some other audio that is different from the primary audio program.

BRIEF DESCRIPTION OF THE DRAWINGS

FIG. 8 illustrates example components of one or more devices, according to one or more implementations described herein.

DETAILED DESCRIPTION OF THE PREFERRED EMBODIMENTS

The following detailed description refers to the accompanying drawings. The same reference numbers in different drawings may identify the same or similar elements.

A user may select (e.g., on a user device) a particular audio program, and the user device may play the audio associated with the selected audio program. Some programming content may not include multiple audio programs and may only include a primary audio program. When an SAP is selected for particular content, and when the broadcast of the particular content ends, the user device may not typically output any audio when the broadcast begins of subsequent content (e.g., content that does not include the secondary audio program) until the user has manually selected the primary audio program. Similarly, if a programming channel is changed, and the content for the changed channel does not include secondary audio, the user may be required to manually select the primary audio program in order for the user device to output audio.

Systems and/or methods, as described herein, may output audio for an available audio program when a previously selected audio program is not available. In some implementations, programming content (e.g., live content, broadcasted content, live broadcasted content, pre-recorded content, stored content, etc.) may be converted to a hypertext transfer protocol (HTTP) live stream (HLS) format and create a playlist having a profile for each available audio program associated with the programming content. A user device may receive information identifying the profiles included in the playlist, and may select a particular profile associated with a user's preferred audio program (e.g., the user's preferred language). If a profile for the preferred audio program does not exist (e.g., for subsequently broadcasted content, or when the programming channel is changed), the user device may select a different profile, such that the user device may still output audio without requiring the user to manually select a different audio program.

Figure 1:
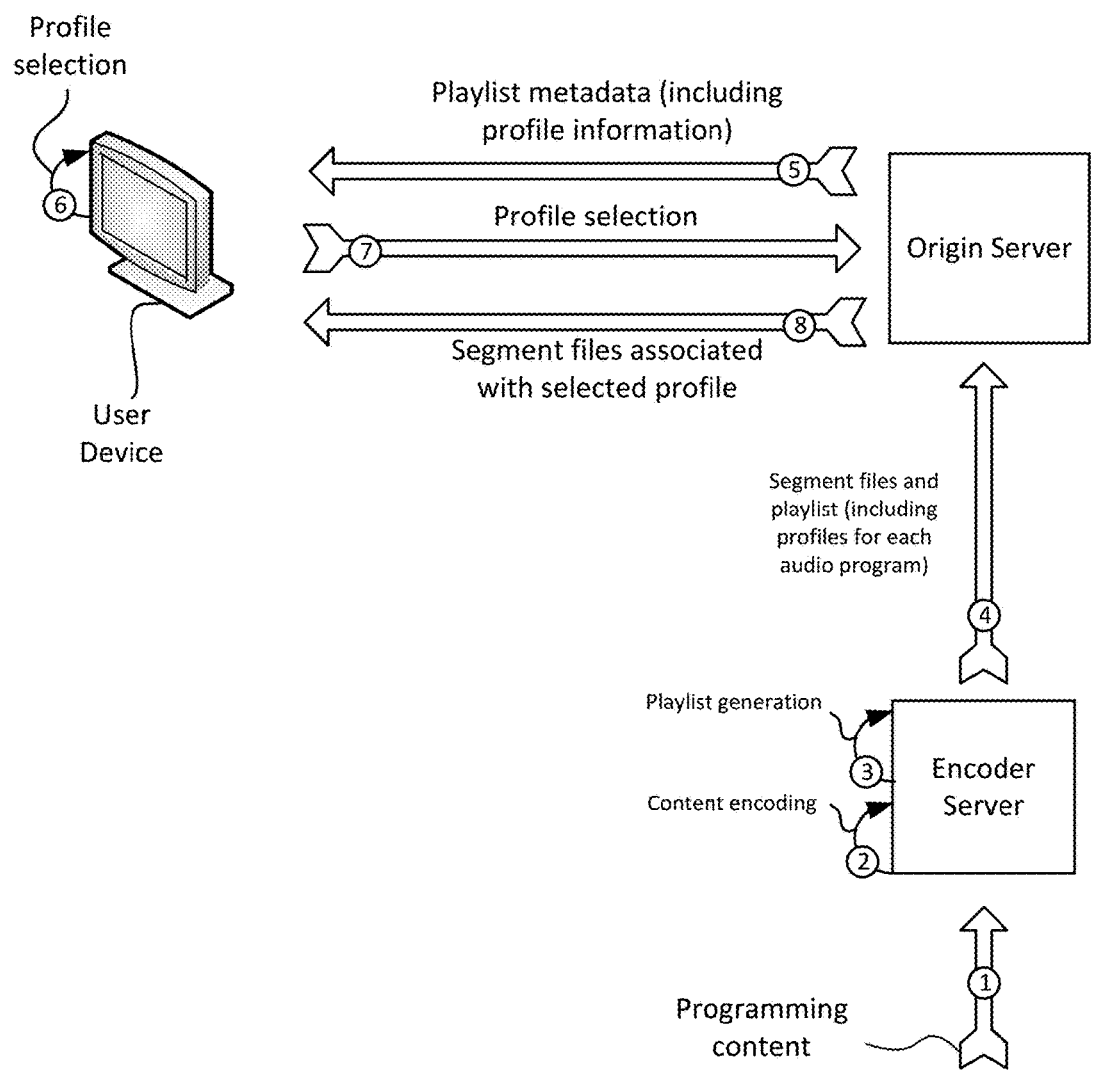
FIG. 1 illustrates an example overview of an implementation described herein.

FIG. 1 illustrates an example overview of an implementation described herein. As shown in FIG. 1 an encoder server may receive programming content (arrow 1) associated with a particular programming channel. In some implementations, the encoder server may receive the content via a quadrature amplitude modulation (QAM) tuner and/or via some other technique. When receiving the content, the encoder server may identify audio programs associated with the content (e.g., based on the received QAM signal). The encoder may encode the received content into an HLS format (arrow 2). For example, the encoder may generate multiple audio and video segment files for the content, and generate multiple versions of each segment file at different bitrates. The encoder may generate one set of video segment files and a set of audio segment files for each audio program associated with the content. As part of the encoding process, the encoder server may generate a playlist (arrow 3) that identifies the video segment files for the content. The playlist may also include a profile for each audio program associated with the content. Each profile may identify a list of audio segment files associated with a particular audio program.

Based on encoding the content and generating the playlist, the encoder server may output the segment files and the playlist to an origin server (arrow 4), which may output playlist metadata (arrow 5) to a user device. The metadata may identify profiles associated with the playlist (e.g., profiles of audio programs associated with the content). As the encoder server continues to receive programming content, the available audio programs may change (e.g., when a programing channel is changed and/or when particular programming content ends and subsequent programming content begins).

As the encoder server continues to receive programming content, the encoder server may continue to encode the content, output audio and video segment files to the origin server, and update the playlist to include profiles for each audio program associated with the programming content. When updating the playlist, the encoder server may continuously update the profiles identifying available audio programs as the availability of audio programs change during the transition of programming content. The user device may select a particular profile identified in the playlist metadata (arrow 6), and output a profile selection (arrow 7) to the origin. The origin server may then output (arrow 8) audio segment files associated with the selected profile (e.g., in addition to the video segment files).

When audio program availability changes (e.g., when particular programming content ends and subsequent programming content begins), the user device may select, without user interaction, a profile for an available audio program even when a previously selected audio program is not available. Further, the encoder server may encode content for each programming channel, and generate, for each programming channel, a playlist with a profile for each available audio program. As a result, the user device may output audio when a user selects to change the programming channel, and when the content for the changed channel does not include the previously selected audio program, thus enhancing the user's experience.

Figure 2:
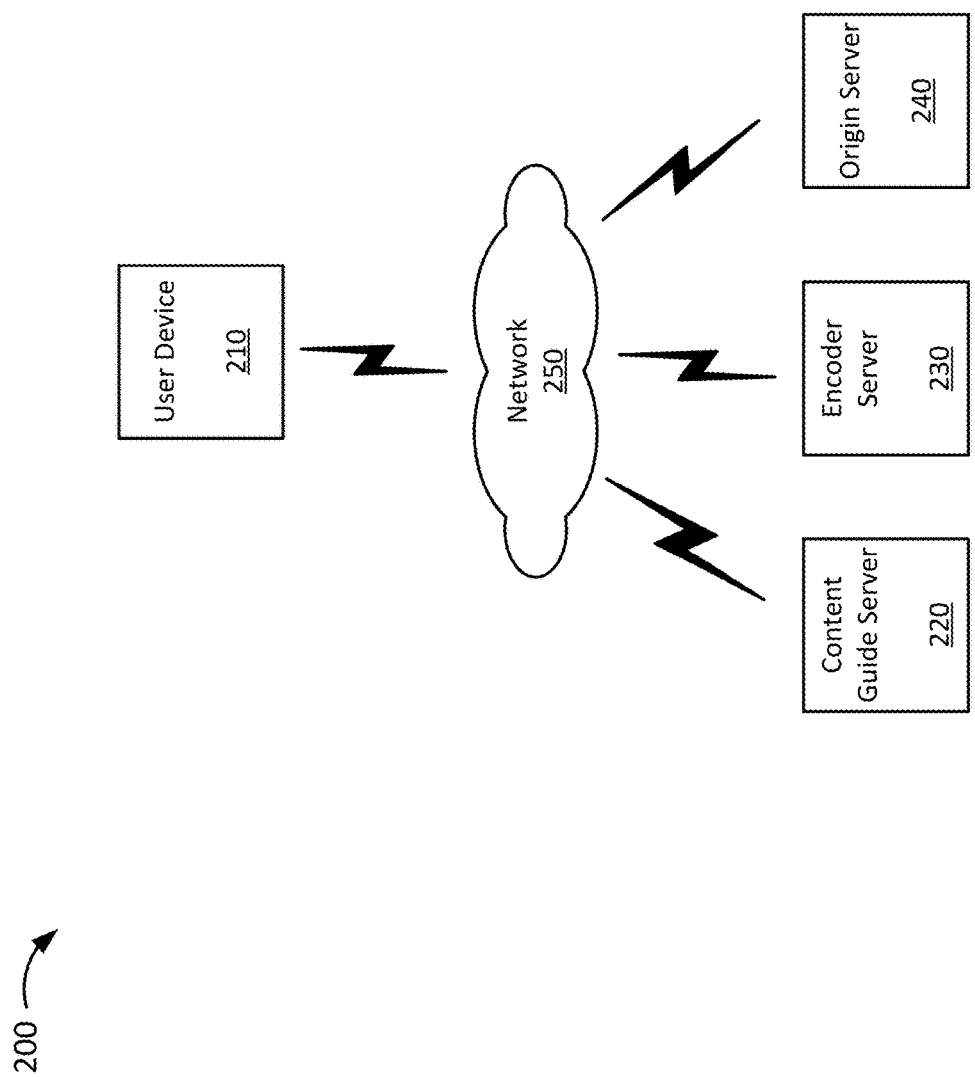
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, content guide server 220, encoder server 230, origin server 240, and network 250.

User device 210 may include a device capable of communicating via a network, such as network 250. For example, user device 210 may correspond to a mobile communication device (e.g., a smart phone or a personal digital assistant (PDA)), a portable computer device (e.g., a laptop or a tablet computer), a desktop computing device, a gaming device, a set-top box, a television, etc.

User device 210 may receive, from content guide server 220, content guide information that identifies content broadcast times and channels. User device 210 may present the content guide information a user interface (e.g., as a channel grid, a channel guide, etc.), and may receive a selection for content and/or a programming channel via the user interface. The content guide information may identify a location identifier (e.g., a link, a uniform resource locator (URL), etc.) for each programming channel (e.g., a link that identifies a playlist for the programming channel). User device 210 may receive playlist metadata associated with a playlist of a programming channel, based on receiving a selection for the programming channel. Additionally, or alternatively, user device 210 may receive the playlist metadata when audio programs change (e.g., when a broadcast for a particular program has ended and the broadcast for a subsequent program begins, and/or when a programming channel has changed).

User device 210 may select a particular audio program corresponding to particular profile identified in the playlist metadata. In some implementations, user device 210 may receive, from content guide server 220, information identifying available audio programs, and may select a particular audio program. User device 210 may select the particular audio program based on user preferences and/or user selections of audio programs. For example, user device 210 may store user preferences that identify a prioritized list of a user's preferred audio program.

Content guide server 220 may include one or more computing devices, such as a server device or a collection of server devices. In some implementations, content guide server 220 may output user device 210 content guide information. For example, content guide server 220 may output information regarding broadcast times and channels for content. The content guide information may include a location identifier for each programming channel. In some implementations, the content guide information may include audio programs associated with broadcast content.

Encoder server 230 may include one or more computing devices, such as a server device or a collection of server devices. In some implementations, encoder server 230 may receive programming content, convert the programming content to an HLS format, and generate a playlist for the programming content. Encoder server 230 may generate a playlist, having a profile for each audio program, for each programming channel. Encoder server 230 may output the converted content and the playlist to origin server 240. In some implementations, encoder server 230 may instruct origin server 240 to delete outdated content (e.g., content for which the broadcast has ended).

Origin server 240 may include one or more computing devices, such as a server device or a collection of server devices. In some implementations, origin server 240 may store a playlist and segment files for each programming channel. Origin server 240 may output, to user device 210, metadata for a playlist for a particular programming channel when user device 210 requests content associated with the programming channel (e.g., when user device 210 receives the selection from a user). Additionally, or alternatively, origin server 240 may output, to user device 210, the metadata for the playlist when profiles for the playlist change (e.g., when the audio programs change when the broadcast of particular content ends and the broadcast of subsequent content begins, and/or when a user of user device 210 has selected to change the programming channel).

Network 250 may include one or more wired and/or wireless networks. For example, network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
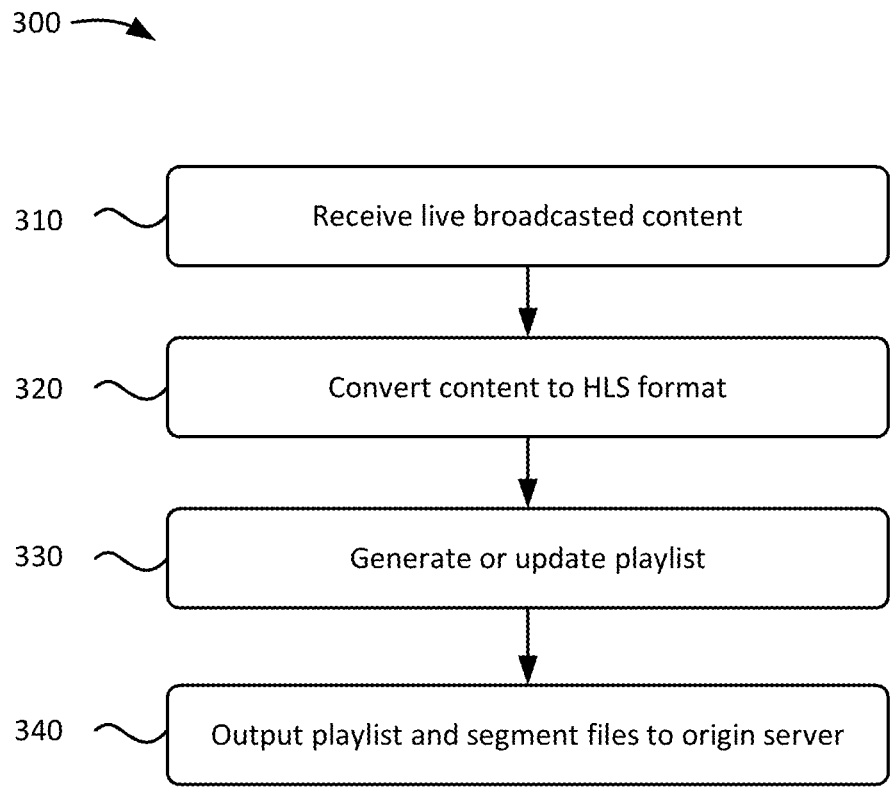
FIG. 3 illustrates a flowchart of an example process for encoding programming content and outputting available audio program information for storage on an origin server.

FIG. 3 illustrates a flowchart of an example process 300 for encoding programming content and outputting available audio program information for storage on an origin server. In some implementations, process 300 may be performed by encoder server 230. In some implementations, some or all of blocks of process 300 may be performed by one or more other devices.

As shown in FIG. 3, process 300 may include receiving programming content (block 310). For example, encoder server 230 may receive programming content, associated with a particular programming channel, via a QAM tuner, a content broadcasting system, and/or from some other source. Based on receiving the programming content, encoder server 230 may identify audio programs associated with the programming content. For example, when the programming content is broadcasted content received via a QAM tuner, encoder server 230 may identify the audio programs based on the QAM signal. When the programming content is pre-recorded or stored content, encoder server may receive the programming content from a content provider, and may receive information identifying the audio programs from the content provider.

Process 300 may also include converting the content to an HLS format (block 320). For example, encoder server 230 may convert the content in to the HLS format by generating multiple audio and video segment files for the content.

Encoder server 230 may generate one set of video segment files including multiple versions of each segment file at different bitrates (e.g., so that content may be delivered to user device 210 using adaptive bitrate techniques). Encoder server 230 may separately generate a set of audio segment files for each audio program associated with the content (e.g., so that audio for a selected audio program may be delivered to user device 210). For example, encoder server 230 may generate one set of audio segment files for a primary language and another set of audio segment files for a secondary language.

Process 300 may further include generating or updating a playlist (block 330). For example, encoder server 230 may generate a playlist that identifies the video segment files and a sequence in which the video segment files should be played by user device 210. The playlist may include a profile for each audio program associated with the content. Each profile may identify audio segment files, associated with a particular audio program, and a sequence in which the audio segment files should be played by user device 210. Each profile may also identify a particular language associated with a corresponding audio program. For example, the playlist may identify the particular language for a particular profile by storing information in a LANGAUGE attribute of an EXT-X-MEDIA metadata tag. The playlist may identify location identifiers associated with the audio and video segment files. In some implementations, the playlist may be in the .m3u8 format and/or some other format. As the broadcast of programming content continues, encoder server 230 may continue to encode the content and update the playlist to include profiles for each audio program associated with the programming content. For example, as the broadcast of one program ends and the broadcast of a subsequent program begins, encoder server 230 may update the playlist to include profiles for the subsequent program.

Process 300 may also include outputting the playlist and segment files to an origin server (block 340). For example, encoder server 230 may output the playlist and the segment files to origin server 240 after converting the content to the HLS format and generating the playlist. Origin server 240 may store the segment files and the playlist. As described in greater detail below with respect to FIG. 4, user device 210 may receive playlist metadata that identifies profiles of the playlist corresponding to available audio programs. User device 210 may select a particular profile, and may receive the particular audio segment files associated with the selected profile (e.g., in addition to the video segment files) in order to present the content and output audio associated with the selected profile. User device 210 may select a profile for an available audio program based on a user's preferences and/or selections. If a profile does not exist for the user's preferred audio program (e.g., the user's preferred language), user device 210 may select another profile so that user device 210 may output audio for an available audio program without requiring the user to manually select an available audio program.

In some implementations, process 300 may be performed in real time so that programming content may be stored by origin server 240 and made available to user device 210. For example, as the broadcast of programming content continues, encoder server 230 may continue to encode the content, update the playlist to include profiles for each audio program associated with the programming content, and output audio and video segment files to origin server 240. In some implementations, process 300 may be performed for each programming channel. For example, encoder server 230 may receive programming content for each programming channel, convert the content to the HLS format, generate a playlist for each programming channel, and output the playlist and segment files to origin server 240.

Figure 4:
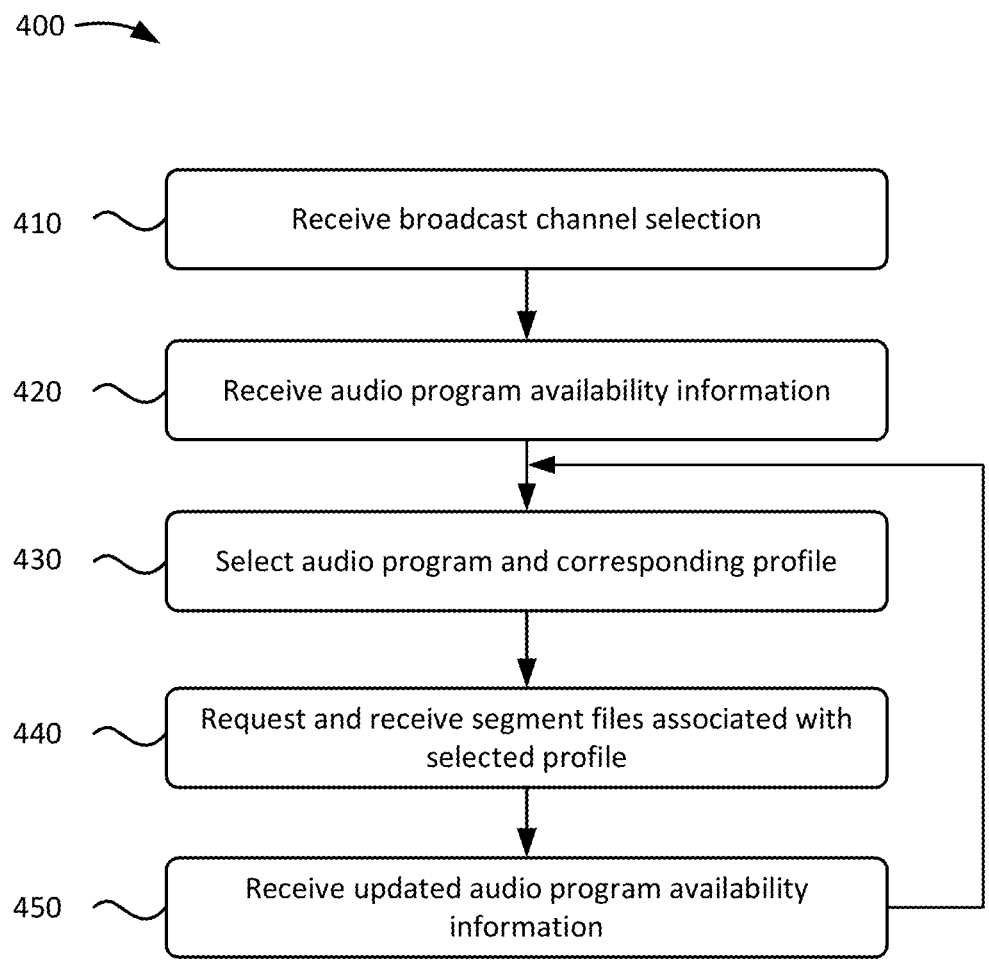
FIG. 4 illustrates a flowchart of an example process for receiving audio program availability information and selecting a particular audio program and corresponding profile.

FIG. 4 illustrates a flowchart of an example process 400 for receiving audio program availability information and selecting a particular audio program and corresponding profile. In some implementations, process 400 may be performed by user device 210. In some implementations, some or all of blocks of process 400 may be performed by one or more other devices.

As shown in FIG. 4, process 400 may include receiving a programming channel selection (block 410). For example, user device 210 may receive a programming channel selection from a user of user device 210. In some implementations, the programming channel selection may be received via a user interface that displays content guide information received from content guide server 220.

Process 400 may further include receiving audio program availability information (block 420). For example, user device 210 may receive audio program availability information from origin server 240 in the form of playlist metadata. The playlist metadata may identify profiles (corresponding to audio programs) associated with a playlist of the selected programming channel. In some implementations, user device 210 may receive the playlist metadata from origin server 240 (e.g., via a location identifier associated with the selected programming channel). Additionally, or alternatively, user device 210 may receive the playlist metadata when user device 210 is already tuned to the selected programming channel and when the playlist metadata changes. For example, the playlist metadata may change when the available audio programs change (e.g., when the broadcast for particular content ends and the broadcast for subsequent content begins, and when encoder server 230 updates the playlist to include profiles corresponding to available audio programs for the subsequent content).

In some implementations, user device 210 may receive audio program availability information from content guide server 220 without relying on encoder server 230 to generate or update the playlist to include profiles for available audio programs. For example, content guide server 220 may output the audio program availability information as part of content guide information. Alternatively, content guide server 220 may output the audio program availability information separately from the content guide information.

Process 400 may further include selecting an audio program and a corresponding profile (block 430). For example, user device 210 may select a particular audio program, of the available audio programs, based on user selections and/or preferences. In some implementations, user device 210 may receive a selection for a preferred audio program from a user. In some implementations, user device 210 may store a ranked list of preferred audio programs (e.g., corresponding to preferred languages). User device 210 may select a particular available audio program based on the user's selection and/or preferences (e.g., the ranked list). For example, user device 210 may select the highest ranked available audio program.

In some implementations, user device 210 may store audio program ranking information for multiple users, and may select the highest ranked available audio program based on user account or login information. In some implementations, the audio program ranking information may be weighted based on content type/genre, content origin (e.g., a geographical location associated with the content), the user's audio program selection history, user device location, and/or based on some other factor. For example, for content of a particular origin, user device 210 may store audio program ranking information that prioritizes a particular language higher than content associated with another origin. In some implementations, information identifying the content type/genre, content origin, and/or other content information may be received from the content guide server. Once user device 210 has selected the highest ranked available audio program, user device 210 may select the corresponding profile associated with the selected audio program.

Process 400 may also include requesting and receiving segment files associated with the selected profile (block 440). For example, user device 210 may request and receive, from origin server 240, the audio segment files identified by the selected profile. User device 210 may also request and receive, from origin server 240, the video segment files identified in the playlist.

Process 400 may further include receiving updated audio program availability information (block 450). For example, user device 210 may receive updated audio program availability information when a different programming channel is selected by the user. Additionally, or alternatively, user device 210 may receive updated audio program information when different audio programs become available for programming content. For example, when the broadcast of particular content ends and the broadcast of subsequent content begins, user device 210 may receive updated audio program availability information. User device 210 may then select a particular available audio program and corresponding profile based on the user's selections and/or preferences (block 430), and may request and receive the segment files associated with the selected profile (block 440). As a result, user device 210 may output audio even when the audio program availability changes as content changes (e.g., as broadcasting of live content continues). Further, user device 210 may continue to output audio without requiring the user to manually select an available audio program.

In some implementations, user device 210 may select a different audio program even if a previously selected audio program is available when particular programming content ends and subsequent programming content begins, or when subsequent content is played in response to a programming channel change. For example, user device 210 may select a different audio program based on attributes of the subsequent audio program (e.g., content type/genre, content origin, and/or some other attribute). As an example, assume that two audio programs (e.g., an English audio program and a Spanish audio program) are both available for programming content 1 and programming content 2. Further, assume that programming content 1 is associated with an origin in which English is the primary language, and programming content 2 is associated with an origin in which Spanish is the primary language. Given these assumptions, user device 210 may select the English audio program when receiving programming content 1, and the Spanish audio program when receiving programming content 2.

Figure 5:
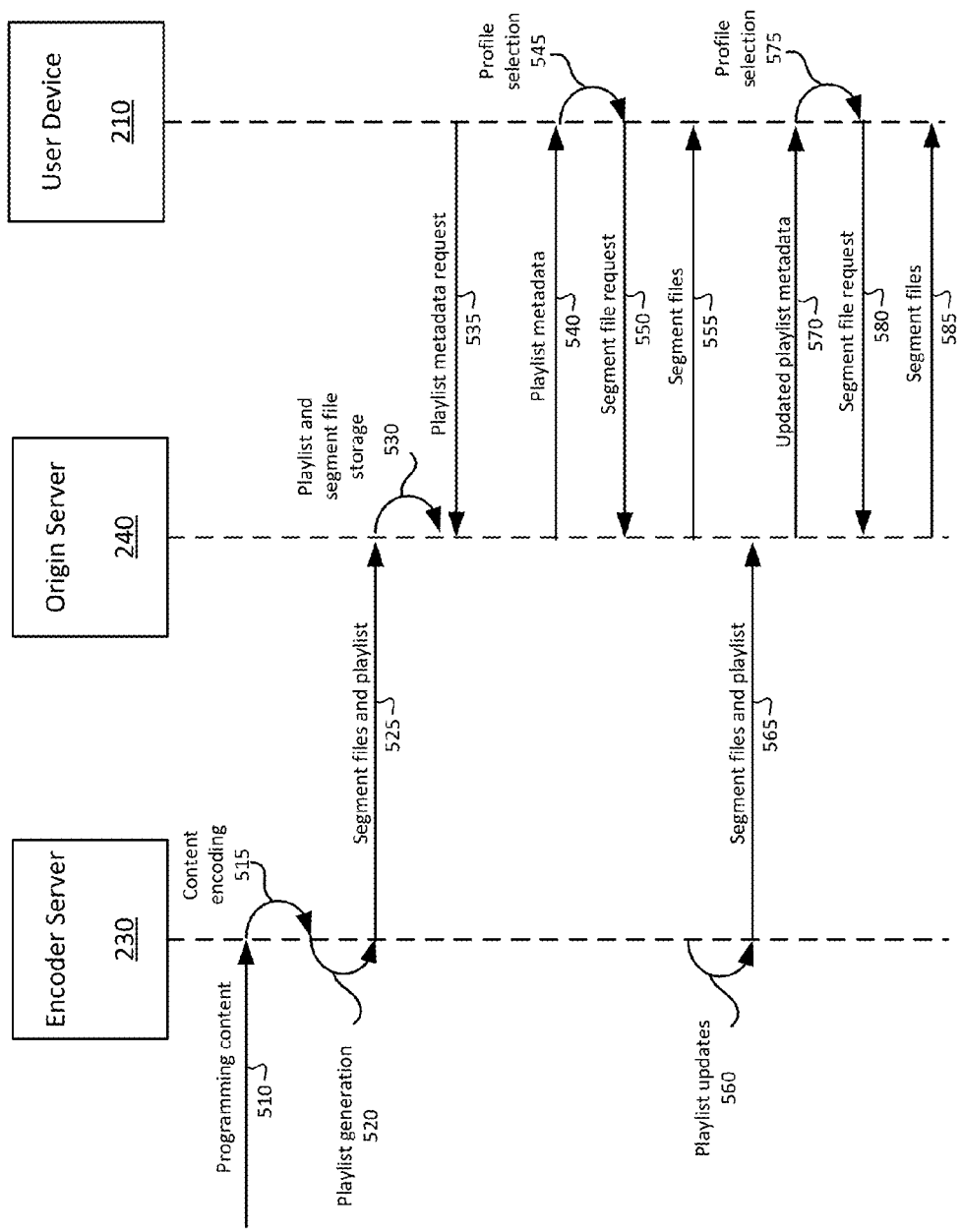
FIG. 5 illustrates a signal flow diagram of example operations for outputting audio on a user device for an available audio program.

FIG. 5 illustrates a signal flow diagram of example operations for outputting audio on a user device for an available audio program. As shown in FIG. 5, encoder server 230 may receive programming content for a particular programming channel (at 510) via a QAM signal (and/or another technique). As encoder server 230 continuously receives the content, encoder server 230 may encode the content (at 515) to convert the content to an HLS format. As part of the encoding process, encoder server 230 may generate video segment files. Encoder server 230 may also identify available audio programs associated with the content (e.g., based on the QAM signal) and generate a set of audio segment files for each audio program. Encoder server 230 may generate a playlist (at 520) that includes profiles for each available audio program. Encoder server 230 may output (at 525) the segment files and the playlist to origin server 240).

Origin server 240 may store the segment files and the playlist (at 530). Origin server 240 may receive a playlist metadata request (at 535) from user device 210 when user device 210 receives a selection for the particular programming channel. For example, user device 210 may request the playlist metadata using a locator identifier associated with the particular programming channel. Origin server 240 may output (at 540) the playlist metadata in response to the playlist metadata request. In some implementations, origin server 240 may output the playlist metadata without receiving the playlist metadata request. As described above, the playlist metadata may identify profiles corresponding to the available audio programs associated with the content. Based on receiving the playlist metadata, user device 210 may determine the highest ranked audio program (e.g., based on user selections and/or preferences), and may select a corresponding particular profile associated with the highest ranked audio program (at 545). User device 210 may request (at 550), audio segment files associated with the selected profile (in addition to the video segment files), and may receive the segment files (at 555) from origin server 240.

As encoder server 230 continues to receive programming content, encoder server 230 may continue to encode the content, and update the playlist for the content (at 560). The playlist updates may identify available audio programs as the broadcast for particular content ends and the broadcast for subsequent content begins. Encoder server 230 may output the segment files and the playlist updates (at 565) to origin server 240. Based on receiving an update to the profiles in the playlist (e.g., when available audio programs change, origin server 240 may output updated playlist metadata (at 570) to user device 210. User device 210 may again determine the highest ranked audio program since the available audio programs have changed as identified by the updated playlist metadata. User device 210 may then select a profile corresponding to the highest ranked audio program (at 575), request the video segment files and the audio segment files associated with the selected audio program (at 580), and receive the segment files from origin server 240 (at 585). As a result, user device 210 may continue to receive audio segment files and output the corresponding audio as available audio programs change throughout the programming of content.

Figure 6:
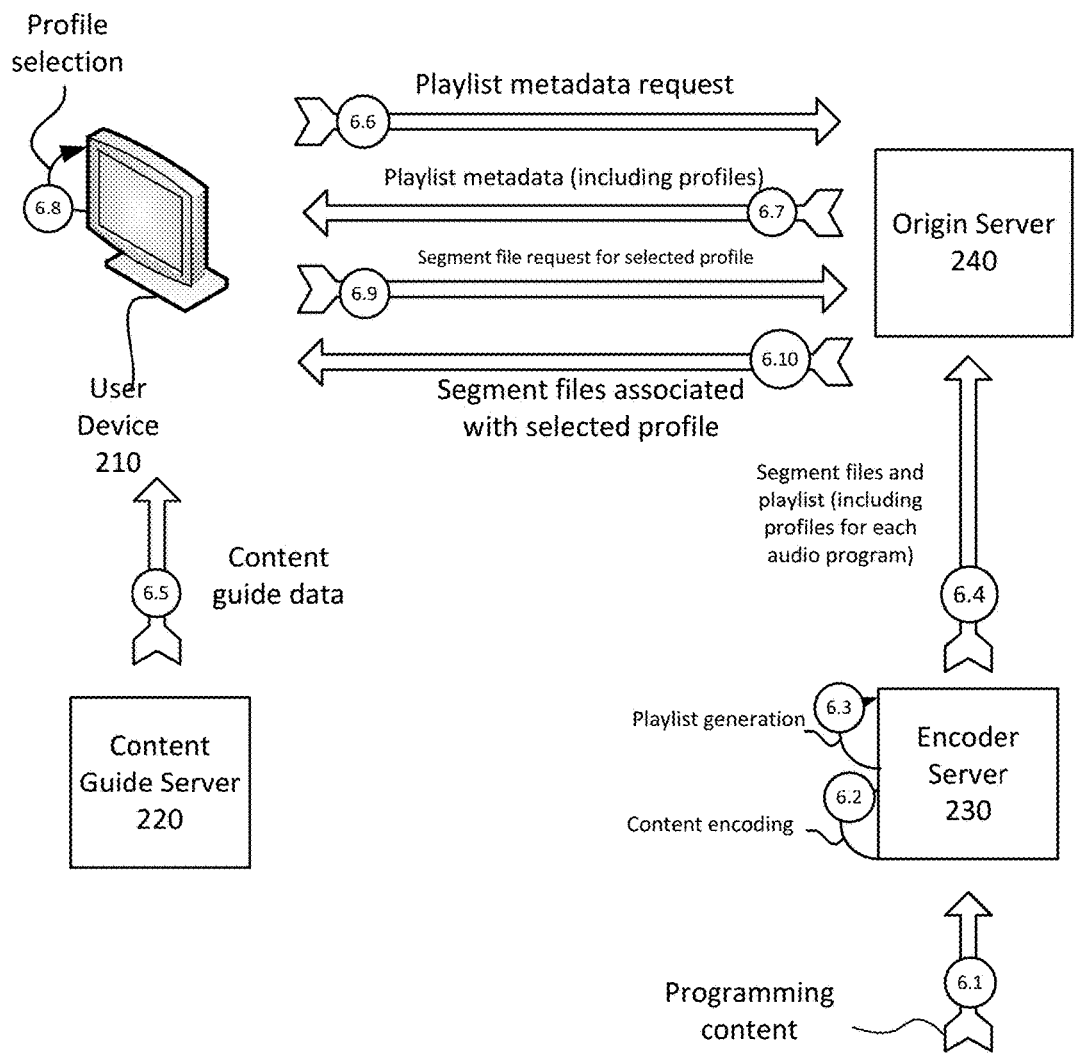
FIGS. 6 and 7 illustrate example implementations for outputting audio on a user device for an available audio program.

FIG. 6 illustrates an example implementation for outputting audio on a user device for an available audio program. As shown in FIG. 6, encoder server 230 may receive programming content (arrow 6.1), encode the content (arrow 6.2) by generating segment files, generate a playlist with profiles for each audio program associated with the content (arrow 6.3), and output the segment files and the playlist to origin server 240 (arrow 6.40). Content guide server 220 may output, to user device 210 (arrow 6.5) content guide data that identifies links for each programming channel. User device 210 may receive a selection of a particular programming channel, and request, from origin server 240 (arrow 6.6), playlist metadata for the selected programming channel using the link associated with the programming channel.

Based on receiving the playlist metadata request, origin server 240 may output, to user device 210 (arrow 6.7) the playlist metadata for the selected programming channel. The playlist metadata may identify profiles corresponding to available audio programs, and user device 210 may select a particular profile based on determining the highest ranked audio program (e.g., based on user selections and/or preferences). User device 210 may request the video segment files and the audio segment files associated with the selected profile (arrow 6.9), and origin server 240 may output, to user device 210 (at 6.10) the segment files associated with the selected profile.

Figure 7:
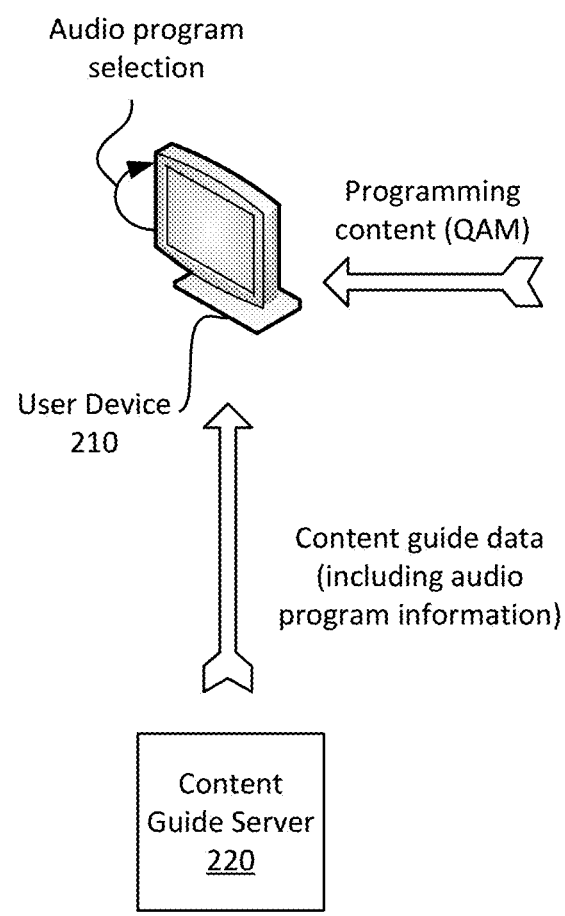

FIG. 7 illustrates an example implementation for outputting audio on a user device for an available audio program. As shown in FIG. 7, a user device may continuously receive programming content via a QAM signal. Content guide server 220 may output content guide data which may identify available audio programs associated with the content. User device 210 may then determine the highest ranked available audio program, and select the highest ranked audio program. Since user device 210 is receiving the content via a QAM signal, user device 210 may output the audio program included in the QAM signal without involving encoder server 230 and/or origin server 240. As available audio programs change, content guide server 220 may output content guide data identifying the updated available audio programs as broadcast of particular content ends and the broadcast of subsequent content begins.

FIG. 8 is a diagram of example components of device 800. One or more of the devices described above (e.g., with respect to FIGS. 1, 2, 5, 6, and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signal flows have been described with regard to FIGS. 3-5, the order of the blocks and/or signal flows may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2, 5, 6, and 7), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by a user device, a selection of a preferred language;
   receiving, by the user device, information identifying a first set of audio programs available for first content;
   selecting, by the user device and based on the preferred language, a first audio program, of the first set of audio programs, the first audio program being associated with the preferred language;
   playing, by the user device, the first content, including playing the first audio program;
   receiving, by the user device, updated information identifying a second set of audio programs available for second content;
   determining, by the user device, that the second set of audio programs does not include an audio program that is associated with the preferred language;
   determining, by the user device and based on the determination that the second set of audio programs does not include an audio program that is associated with the preferred language, a geographical location associated with the second content;
   determining, by the user device, a primary language associated with the geographical location;
   determining, by the user device, a location of the user device;
   selecting, by the user device and without user interaction, a second audio program, of the second set of audio programs, based on determining that the second set of audio programs does not include an audio program that is associated with the preferred language, the selecting being based on:
      the determined primary language, and
      the determined location of the user device; and
   playing, by the user device, the second content, including playing the second audio program.

2. The method of claim 1, further comprising:
   receiving a selection of a programming channel, the programming channel corresponding to the second content; and
   requesting, based on receiving the selection of the programming channel, the updated information identifying the second set of audio programs,
   wherein receiving the updated information identifying the second set of audio programs is based on requesting the updated information identifying the second set of audio programs.

3. The method of claim 2, wherein requesting the updated information identifying the second set of audio programs includes requesting the updated information identifying the second set of audio programs via an identifier associated with the programming channel.

4. The method of claim 1, wherein receiving the updated information identifying the second set of audio programs includes receiving the updated information based on an ending time of the first content and a beginning time of the second content.

5. The method of claim 1, further comprising:
   requesting, from an origin server and based on selecting the first audio program, a first set of segment files that correspond to the first audio program;
   receiving, from the origin server, the requested first set of segment files,
      wherein playing the first audio program includes playing the first set of segment files;
   requesting, from the origin server and based on selecting the second audio program, a second set of segment files that correspond to the second audio program; and
   receiving, from the origin server, the requested second set of segment files,
      wherein playing the second audio program includes playing the second set of segment files.

6. The method of claim 1, wherein the information, identifying the first set of audio programs or the updated information identifying the second set of audio programs, is received from a content guide server,
   wherein playing the first audio program or the second audio program includes receiving the first audio program or the second audio program via a Quadrature Amplitude Modulation (QAM) signal.

7. The method of claim 1, further comprising:
   receiving a ranked list of languages, in which the preferred language is the highest ranked language,
      wherein the second audio program is selected based on a position of a language, associated with the second audio program, in the ranked list.

8. The method of claim 1, wherein selecting the second audio program is further based on a genre of the second content.

9. The method of claim 1, wherein selecting the second audio program is further based on selection history, associated with the user device, of past audio programs.

10. A user device comprising:
    a non-transitory memory device storing:
       a plurality of processor-executable instructions; and
    a processor configured to execute the processor-executable instructions, wherein executing the processor-executable instructions causes the processor to:
       receive a selection of a preferred language;
       receive information identifying first set of audio programs available for first content;
       select, based on the preferred language, a first audio program, of the first set of audio programs, the first audio program being associated with the preferred language;
       play the first content, including playing the first audio program;
       receive a selection to change the playing content, from the first content to second content;
       receive, based on the selection to change the playing content, updated information identifying second set of audio programs available for the second content;
       determine that the second set of audio programs do not include an audio program that is associated with the preferred language;
       determine, based on the determination that the second set of audio programs does not include an audio program that is associated with the preferred language:
          a geographical location associated with the second content, and a geographical location of the user device;
select, based on the determined primary language and the determined geographical location of the user device, and without user interaction, a second audio program, of the second set of audio programs, based on determining that the second set of programs does not include an audio program that is associated with the preferred language; and
play, based on the selection to change the playing content, the second content, including playing the second audio program.

11. The user device of claim 10, wherein executing the processor-executable instructions further causes the processor to:
receive a selection of a programming channel, the programming channel corresponding to the second content; and
request, based on the selection of the programming channel, the updated information identifying the second set of audio programs,
wherein executing the processor-executable instructions, to receive the updated information identifying the second set of audio programs, causes the processor to receive the updated information identifying the second set of audio programs based on requesting the updated information identifying the second set of audio programs.

12. The user device of claim 11, wherein executing the processor-executable instructions, to request the updated information identifying the second set of audio programs, causes the processor to request the updated information identifying the second set of audio programs via an associated with the programming channel.

13. The user device of claim 10, wherein executing the processor-executable instructions further causes the processor to:
request, from an origin server and based on selecting the first audio program, a first set of segment files that correspond to the first audio program;
receive, from the origin server, the requested first set of segment files,
wherein executing the processor-executable instructions, to play the first audio program, causes the processor to play the first set of segment files;
request, from the origin server and based on selecting the second audio program, a second set of segment files that correspond to the second audio program; and
receive, from the origin server, the second set of segment files,
wherein executing the processor-executable instructions, to play the second audio program, causes the processor to play the second set of segment files.

14. The user device of claim 10, wherein executing the processor-executable instructions, to receive the information identifying the first set of audio programs or the updated information identifying the second set of audio programs, causes the processor to receive the information identifying the first set of audio programs or the updated information identifying the second set of audio programs from a content guide server,
wherein executing the processor-executable instructions, to play the first audio program or the second audio program, causes the processor to receiving the first audio program or the second audio program via a Quadrature Amplitude Modulation (QAM) signal.

15. The system of claim 10, wherein executing the processor-executable instructions further causes the processor to:
receive a ranked list of languages, in which the preferred language is the highest ranked language,
wherein the second audio program is selected based on a position of a language, associated with the second audio program, in the ranked list.

16. A method comprising:
determining, by the server device, a set of audio programs, that each correspond a different language, available for particular content;
identifying, by the server device, a geographical region that is an origin of corresponding to the particular content;
identifying, by the server device, a geographical location of a user device;
identifying, by the server device, a primary language associated with the origin of the particular content;
receiving, by the server device and from the user device, a ranked list of languages that includes the identified primary language;
modifying, by the server device, the ranked list of languages based on identifying the primary language and the geographical location of the user device;
identifying, by the server device, a particular audio program, of the first set of audio programs, based on the ranked list of languages received from the user device and the modifying of the ranked list of languages; and
outputting, by the server device and to the user device, the identified particular audio program.

17. The method of claim 16, further comprising:
identifying that the particular audio program corresponds to a highest ranking language, according to the rankings in the ranked list, out of the languages that correspond to the set of audio programs.

18. The method of claim 17, wherein none of the languages, that correspond to the set of audio programs, match a highest ranking language, in the ranked list,
wherein the language, that corresponds to the identified audio program, matches a second ranked, or lower than second ranked, language in the ranked list.

19. The method of claim 16, wherein the language, that corresponds to the particular audio program, is a highest ranking language in the ranked list, wherein the set of audio programs is a first set of audio programs, wherein the particular content is first content, the method further comprising:
receiving a second set of audio programs associated with second content, wherein each audio program, of the second set of audio programs, corresponds to a different language;
determining that the languages, that correspond to the second set of audio programs, do not include the highest ranked language in the ranked list;
identifying a particular audio program, in the second set of audio programs, that corresponds to a second highest ranked language in the ranked list; and
outputting, to the user device, the second audio program.

20. The method of claim 19, wherein outputting the second audio program is performed based on a determination that the second content has been requested to be played by the user device.

* * * * *